UNITED STATES PATENT OFFICE.

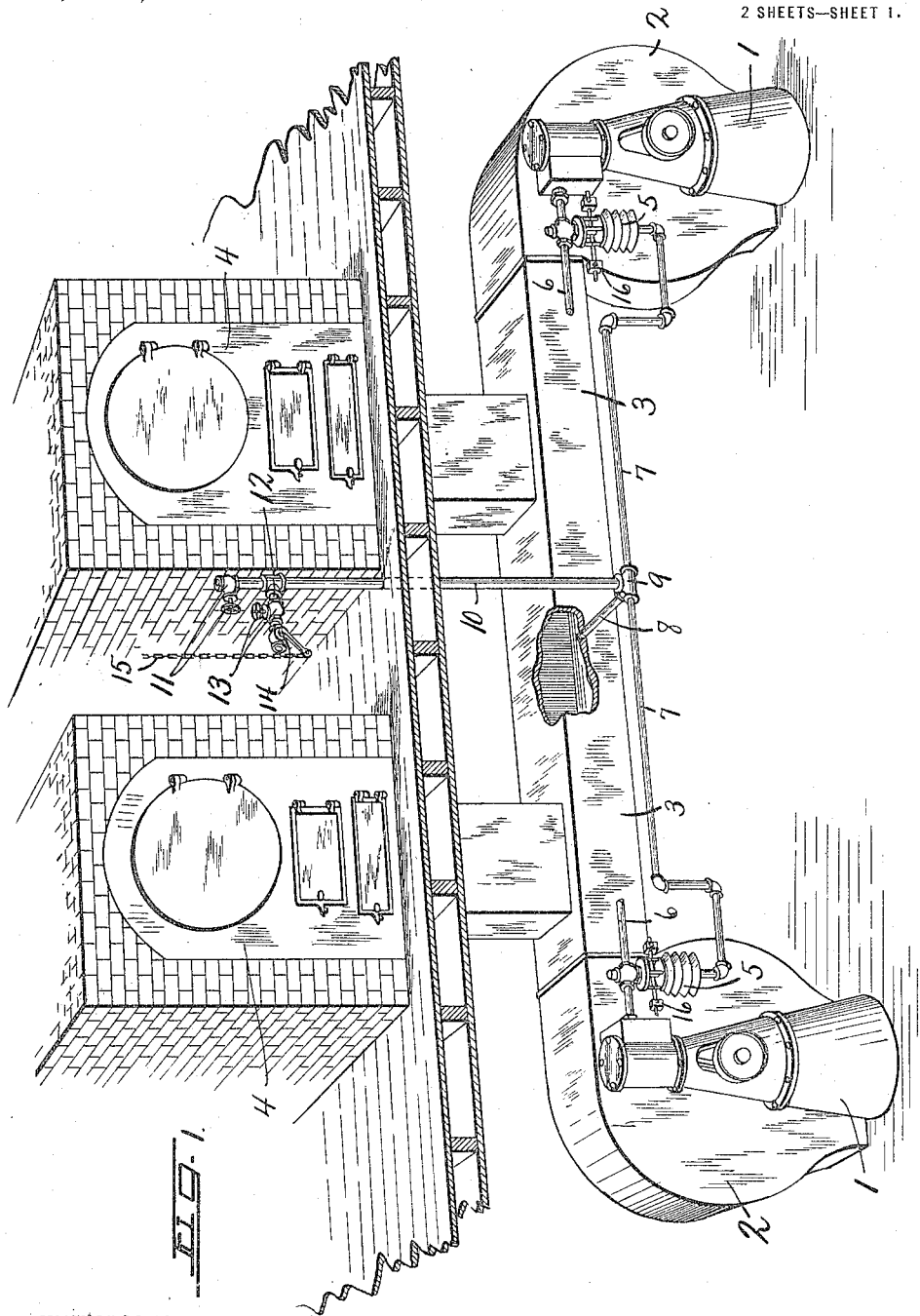

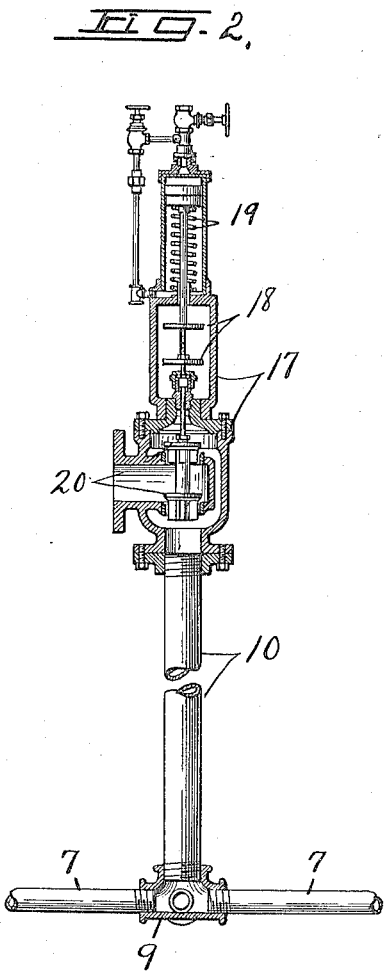

WILLARD A. KITTS, JR., OF NEW YORK, N. Y.

AIR-VALVE CONTROL.

1,196,368.　　　Specification of Letters Patent.　　Patented Aug. 29, 1916.

Application filed August 27, 1914. Serial No. 858,889.

*To all whom it may concern:*

Be it known that I, WILLARD A. KITTS, Jr., of New York, borough of Brooklyn, in the county of Kings, in the State of New York, have invented new and useful Improvements in Air-Valve Control, of which the following, taken in connection with the accompanying drawings, is a full, clear, and exact description.

This invention relates to certain improvements in air valve control and more particularly to a means of remote control operable at any predetermined and convenient place, to secure and maintain any constant air pressure or vacuum in a main air duct by controlling through an air valve the speed of the engine driving the fan supplying the air to or exhausting the air from said duct.

Heretofore it has been a very serious and difficult matter to secure and maintain any constant uniform air pressure or vacuum in a main air duct, irrespective of the amount of air drawn therefrom or let therein, and to easily and quickly change this air pressure or vacuum to any other pressure or vacuum required and at the same time provide means to automatically control the air pressure or vacuum within close limits so that, as an instance, if used in connection with steam boilers a practically uniform steam pressure may be maintained and although with the device shown in my Patent No. 1,007,451 it is possible by means of weights, mechanically movable to adjust the operation of the air valve and thereby the speed of the engine and the fan, yet this adjustment can be made only at the regulator itself and by overcoming the fluid pressure by adjustable physical weight, and in the ordinary installation when two engines and two fans discharging into the same air duct are used, each regulator must be independently adjusted to substantially the same speed, at least so that the fans deliver substantially the same amount of air and this necessitates carefully noting the respective speeds and pressures and consumes a good deal of time of the workmen in going back and forth to adjust them with respect to each other, and is very inconvenient and expensive where it is found necessary to frequently change the air pressure; and it is found to be equally inconvenient and expensive to adjust an engine and fan when used to maintain an induced draft or to hold any partial vacuum in a main air duct.

The primary object, therefore, of my invention is to provide means whereby an air valve may be controlled and regulated from any predetermined point and in such a manner that any desired pressure or vacuum may be uniformly maintained in a main air duct, independent of the amount of air drawn therefrom, or let therein.

A further object is to overcome one of the objections above noted by providing means for controlling and regulating a plurality of air valves in uniform and by unitary means.

As an example of the utility of my invention and its construction and arrangement as applied to a force draft for steam boilers, and as illustrative of a method of attaining the above objects, I have shown the accompanying drawings.

In the drawings—Figure 1 is a view showing an application of this invention. Fig. 2 is a sectional view of a different means for regulating and adjusting the amount of air drawn from or let into the air valve duct.

I have shown a pair of stationary engines —1— suitably arranged for operating a pair of fans disposed within the casings —2— and discharging into a common main air duct —3— having any number of branch air ducts leading to boilers —4—, so that any number of boilers may be used in connection with a single main air duct.

For the purpose of controlling the speed of the engines —1— and the fans, and thereby the pressure in the main air duct —3—, a pressure operated regulator —5— is operably connected in the pipe —6— carrying the operating fluid, as steam, to the steam chest for operating the engine —1—.

The regulator —5— as shown is similar to that disclosed in my patent above set forth, but it will be readily apparent that this invention is not limited to this particular form of air valve, as many other forms of air valves may be utilized, the invention residing in the means for controlling the valve and not in the valve itself. If a single engine, fan, etc., were to be used, the air valve —5— would be connected to the main air duct —3— by means of an air valve duct —7— and a connecting duct —8—. In the dual construction shown, however, I have illustrated the two air valves —5— as having their air valve ducts —7— connected by a 4-way union or cross —9— disposed substantially midway between the air valves and the connecting duct —8— as leading from the main air duct —3— to the air valve ducts —7— through the union —9—. This union has its openings for the reception of the ducts —7— and the duct —8— all of substantially the same size and its other opening of greater size, preferably substantially twice the diameter of the other openings so that, as an example, if the ducts —7— and the duct —8— are one inch in diameter, a bleeder or draw-off pipe —10— of substantially two inches in diameter may be connected in the other opening. This bleeder pipe —10— may have its unconnected end terminate at any predetermined and convenient place and is provided with a bleeder valve —11— which, when open, allows the escape of the air from the air valve ducts —7— thereby reducing the pressure in these ducts and reducing the pressure to which the air valves —5— are subjected. The bleeder pipe —10— is provided with a T —12— having an extension within which is positioned an auxiliary bleeder valve —13—. A lever operated valve —14— is positioned in this extension beyond the auxiliary bleeder valve —13— and this lever valve is normally open and pressure operated through any suitable and well known means connected to the flexible link or chain —15—, so that after a predetermined steam pressure is reached in the boiler the lever valve will be closed thereby.

The operation is as follows: In starting up an installation of this kind, the bleeder valve —11— and the auxiliary bleeder valve —13— are closed. The engines —1— will be started and the air pressure regulating valve will be adjusted by means of the weights —16— to maintain, say one-half inch air pressure by water gage in the main air duct. After this one-half inch air pressure has been secured, the auxiliary bleeder valve —13— is slightly opened drawing off some of the air from the air valve ducts —7— leading to the air valves which will cause an action to take place in the air valves, the same as though the air pressure had actually been reduced in the main air duct —3—, that is the valve will open and allow more of the operating fluid to pass through the pipe —6—. Consequently the engines —1— and the fans will pick up speed and increase the air pressure in the main air duct, say to a pressure of three-quarters of an inch by water gage. Now if the operator in charge of the plant determines it is necessary to carry, say three inches, of air under his fires, he opens the bleeder valve —11— and draws off enough air from the air valve ducts —7— until the engines —1— and the fans increase the speed and build up the air pressure in the main air duct to three inches and this air pressure will remain constant at three inches, irrespective of how many boilers are taking air from the duct. The lever valve —14— is, as above stated, operably connected to a damper regulator. Now if three inches of air will give the proper rate of combustion to maintain two hundred pounds of steam on a power plant and this is the amount of steam pressure desired, then the damper regulator may be set so that it will operate to automatically close the lever valve —14— when the steam pressure exceeds two hundred pounds. By the closing of this valve, the pressure in the air valve ducts —7— will be sufficiently increased to cause the air valves to operate and to reduce the air pressure in the main air duct —3— to substantially two and three-quarters inches. The combustion in the boilers will decrease and the steam pressure decrease until it falls below two hundred pounds, at which time the lever valve —14— will again be opened to decrease the air pressure in the air valve ducts —7— and thereby through the action of the air valves increase the pressure in the main air duct —3—, and thereby increase the combustion in the boilers, so that by the means here shown the pressure in the main air duct may be raised to any predetermined air pressure and may be automatically regulated within the limits of a quarter of an inch, more or less, at any pressure, as first determined by the opening of the auxiliary bleeder valve —13—.

The air valve duct —7—, the communicating duct —8— and their connecting means, as the union —9—, have been designated in the claims hereinafter appended as the air valve system.

In Fig. 2, I have shown a governor —17— instead of the valves —11—, —13—, and —14—, which may be operably connected to the bleeder pipe —10— and may be adjusted by means of the hand wheels —18— to vary the lift of the valve disks —20— from the valve seats and to draw off sufficient air from the air valve ducts —7— to secure any air pressure required in the main air duct, and then if the steam pressure in the boilers varies either above or below the pressure at which the governor is set, the valve disks —20— will be slightly opened or closed resulting in a greater or less bleeding of the air and a corresponding action of the air valves —5—. The operation, however, would be upon essentially the same principle as that set forth in Fig. 1.

It will be readily apparent that there are many different connections in which this invention may be utilized in either air pressure or vacuum systems and that many changes may be made in the arrangement and construction of the parts and in the means for regulating the bleeding of the air, either in or out of the air valve system, without departing from the spirit of this invention as set forth in the appended claims, the essential feature of which is the use of the bleeder pipe and the word "pressure" as used in the appended claims is deemed to include all pressures, whether above or below atmospheric pressure.

What I claim is:

1. The method of controlling the speed of an engine driving a plus or minus pressure creating device, consisting in withdrawing a portion of the pressure created from the main body thereof and varying the withdrawn pressure by allowing a regulated communication of the same with the atmosphere, and utilizing said pressure as varied to determine the speed of the pressure creating device.

2. The method of controlling the speed of an engine driving a plus or minus pressure creating device, consisting in continuously withdrawing a portion of the pressure created from the main body thereof and varying the withdrawn portion of the pressure by allowing communication of said withdrawn pressure with the atmosphere, utilizing the result produced by the main body of pressure for automatically regulating such communication of the withdrawn pressure with the atmosphere, and utilizing said withdrawn pressure as varied to determine the speed of the pressure creating device.

3. An air valve control comprising a main air duct, an air valve duct connected thereto, and means for controlling the pressure in the air valve duct independent of the pressure in the main air duct.

4. An air-valve control comprising a main air duct, an air-valve system having means of communication with the main air duct, and a bleeder conduit connected with said air valve system.

5. An air-valve control comprising a main air duct, an air-valve system having means of communication with the main air duct, a bleeder conduit connected with said air-valve system, and means for regulating the air passing through said bleeder conduit.

6. An air-valve control comprising a main air duct, an air-valve duct, a conduit forming communicating means between the main air duct and the air valve duct, and means for controlling the air supplied to said air valve.

7. An air-valve control comprising an air valve, an air-valve duct leading thereto, a main air duct, means of communication between the main air duct and the air valve duct, a bleeder pipe leading from or to the air valve duct, and a bleeder valve in connection therewith.

8. An air-valve control comprising an air valve, an air-valve system leading thereto, a main air duct communicating with the air-valve system, a bleeder pipe leading from or to the air-valve system, and a bleeder valve in connection therewith.

9. An air-valve control comprising an air valve, an air-valve duct leading thereto, and means for admitting or discharging a regulated amount of air to or from said air valve duct.

10. An air-valve control comprising an air valve, an air-valve duct leading thereto, a main air duct, means of communication between the main air duct and the air valve duct, and means for partially neutralizing the pressure communicated to the air valve duct from the main air duct.

11. An air-valve control comprising a bleeder pipe operably connected in the air-valve system, and a valve controlling said bleeder pipe.

12. An air-valve control comprising a bleeder pipe operably connected in the air-valve system, a bleeder valve therefor, an auxiliary bleeder valve in connection with said pipe, and a regulating valve operably disposed with respect to the auxiliary bleeder valve.

13. An air-valve control comprising a bleeder pipe operably connected in the air-valve system, a bleeder valve therefor, an auxiliary bleeder valve in connection with said pipe, a regulating valve operably disposed with respect to the auxiliary bleeder valve, and means for automatically controlling said regulating valve.

14. An air-valve control comprising a main air duct, an air-valve duct, a conduit forming a communication between said ducts, and a bleeder pipe for bleeding off air from or letting air into said air valve duct and of substantially greater diameter than said conduit.

15. An air-valve control comprising a main air duct, an air-valve duct, a conduit forming communicating means between the main air duct and the air-valve duct, and means for controlling the vacuum produced in said air-valve duct by the vacuum in the main air duct.

16. An air valve control comprising a main air duct, an air valve duct, a conduit connecting the main air duct and the air valve duct, a bleeder duct connected to said air valve duct, said bleeder duct of greater diameter than said conduit, and means for regulating the passage of air through the bleeder duct.

In witness whereof I have hereunto set my hand this twenty-fifth day of November, 1913.

WILLARD A. KITTS, Jr.

Witnesses:
H. A. D'ARCY,
GEORGE G. ALBRECHT.

Copies of this patent may be obtained for five cents each, by addressing the "Commissioner of Patents, Washington, D. C."